Apr. 3, 1923.
C. LÉPINE
1,450,555
APPARATUS FOR DIRECT OBSERVATION OF PICTURE FILMS
Original Filed Mar. 22, 1921    2 sheets-sheet 1
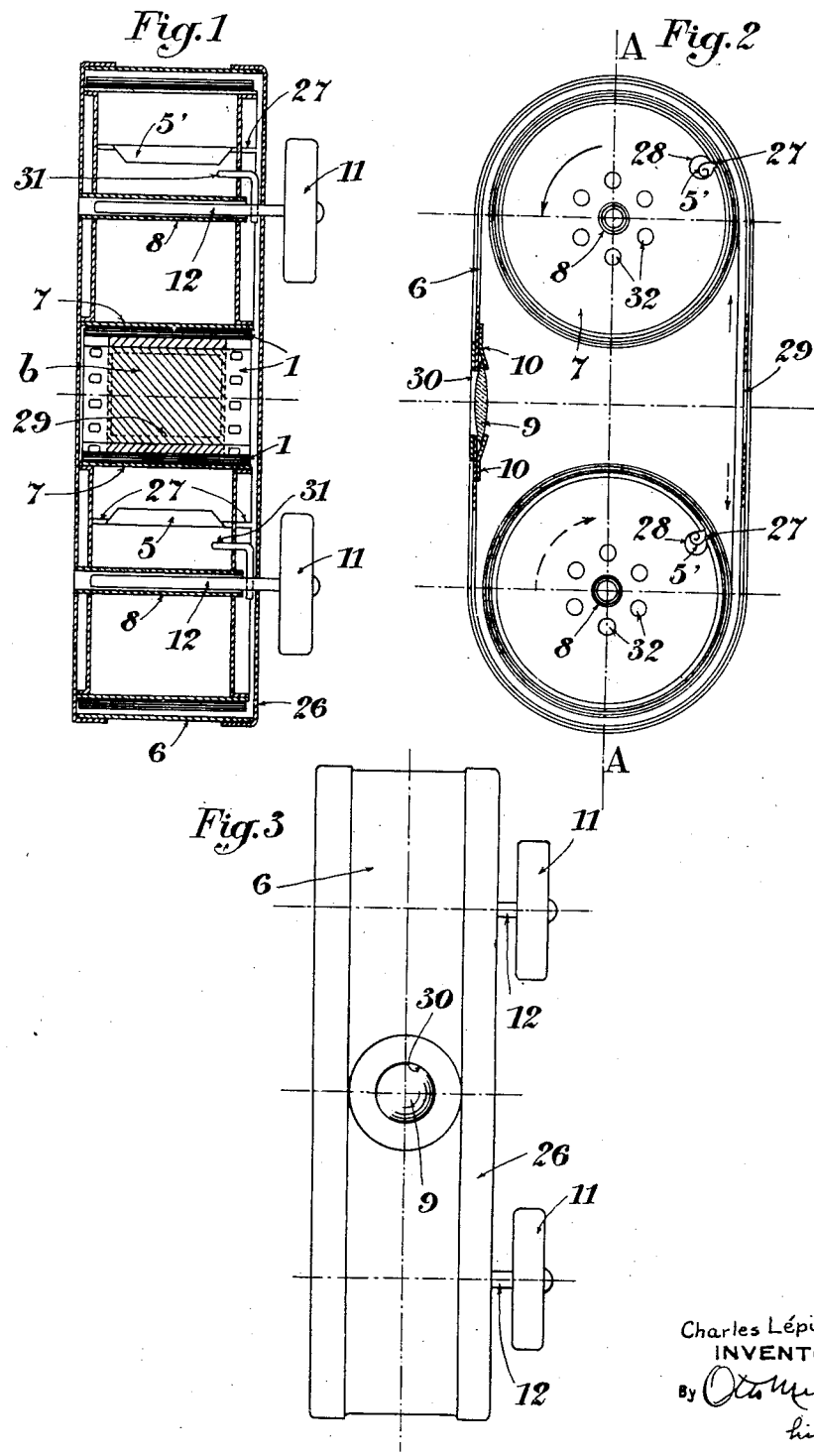
Charles Lépine
INVENTOR;

Apr. 3, 1923.
C. LÉPINE
1,450,555
APPARATUS FOR DIRECT OBSERVATION OF PICTURE FILMS
Original Filed Mar. 22, 1921.    2 sheets-sheet 2
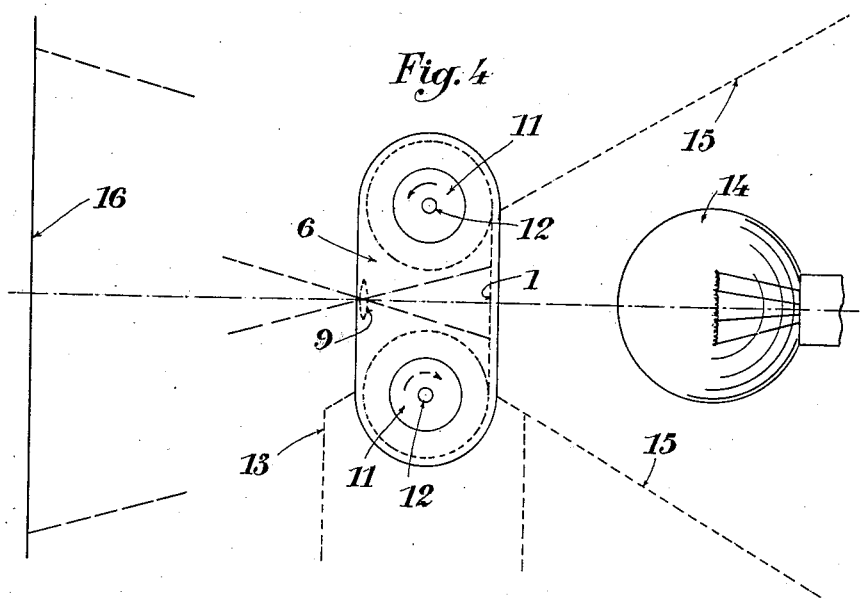
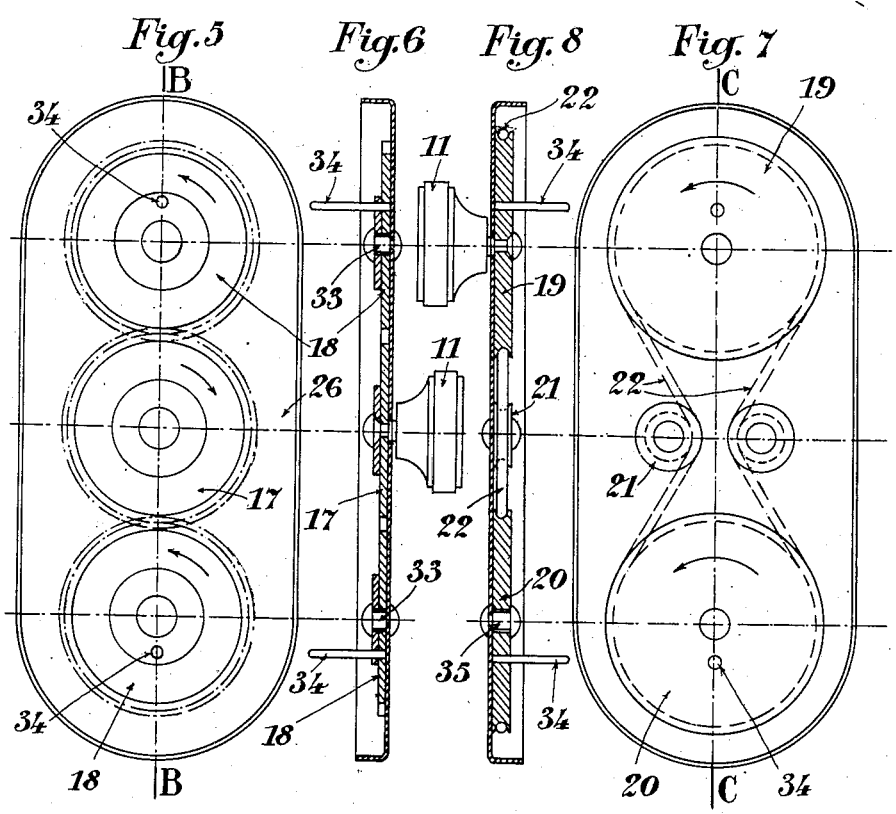
INVENTOR;
Charles Lépine
By
his Attorney.

Patented Apr. 3, 1923.

1,450,555

UNITED STATES PATENT OFFICE.

CHARLES LÉPINE, OF TORINO, ITALY, ASSIGNOR TO PATHE CINEMA, ANCIENS ETABLISSEMENTS, PATHE FRERES, OF PARIS, FRANCE.

APPARATUS FOR DIRECT OBSERVATION OF PICTURE FILMS.

Original application filed March 22, 1921, Serial No. 454,404. Divided and this application filed March 11, 1922. Serial No. 543,068.

*To all whom it may concern:*

Be it known that I, CHARLES LÉPINE, citizen of the Republic of France, residing at Torino, Italy, have invented new and useful Improvements in Apparatus for Direct Observation of Picture Films (for which I have filed applications in Italy, May 5, 1919; in Germany, March 30, 1921; Austria, March 19, 1921; Hungary, March 21, 1921; Belgium, March 15, 1921; Switzerland, March 17, 1921; Sweden, March 30, 1921; Spain, March 26, 1921; Portugal, March 28, 1921; Czechoslovakian Republic, March 31, 1921; Yugoslavia, March 14, 1921; Poland, March 24, 1921; Tunis, March 22, 1921; Morocco, March 30, 1921; Great Britain, April 14, 1921; Holland, March 19, 1921; Canada, May 3, 1921), of which the following is a specification.

In his application No. 454,404 of which this application is a divisional application, the applicant has described improved picture films. The present invention relates to an apparatus used for the direct examination of the said improved composite films and for their projection upon the screen if so desired.

The following drawings set forth this invention by way of example wherein:

Fig. 1 is a vertical section on the line A—A (Fig. 2) of an apparatus for the direct observation of the said film and for projecting the same upon the screen if required.

Fig. 2 is a section perpendicular to Fig. 1.

Fig. 3 is a front view.

Fig. 4 shows the method of using the apparatus for screen projection.

Fig. 5 is a section similar to Fig. 2 showing a modified form of construction.

Fig. 6 is a corresponding section on the line B—B Fig. 5.

Fig. 7 is another modified form of construction.

Fig. 8 is a section on the line C—C, Fig. 7.

The device employed for the direct observation of the film is constitued (Figs. 1 to 3) by an oblong casing 6, preferably constructed of sheet metal, which is closed by the removable cover 26. Within the said casing and towards the ends thereof are disposed the two drums 7 revoluble upon the parallel hollow shafts 8 secured to the side of the said casing. Each of the drums 7 is provided at the periphery with a slot 27 co-acting with a notch formed in one end of the drum. Through the slot 27, the end 5 of the composite film and the wound up portion 5' are introduced, and the latter portion is caused to bear in the interior against the periphery of the said drum, thereby providing for the suitable connection between the film and the drum. The film 1 which is thus secured at the ends thereof to the two drums 7 respectively, is caused to unroll adjacent the rear side of the casing, wherein is formed the aperture 29. In the other side of the casing 6, and opposite the aperture 29, is disposed adjacent an aperture 30 in the said casing a convergent lens having a suitable focal distance for effecting the direct observation of the film views, the said lens being secured to the side of the casing by any suitable means, for instance by the small tongues 10.

The drums are rotated by means of the heads 11 whose shafts pass loosely through suitable apertures in the cover 26 and extend within the corresponding hollow shafts 8. A bent portion 31 with which each shaft is provided, is caused to enter any one of a set of apertures 32 formed in the front end of each drum, thus providing for the coupling between the drum and the corresponding actuating head.

The film is disposed in the above described apparatus as shown in Fig. 2, and the cover of the casing is secured in position, care being taken that the bent portions 31 of the shafts 12 shall properly enter the apertures 32, and one or the other of the heads 11 can now be operated in the sense of the arrows in order to wind the film in one direction or the other and to be able to observe through the lens 9 the various views composing the film as these views are caused to pass before the aperture 29.

The film may likewise be operated by the use of a single head, as shown in the modified forms of construction, Figs. 5 to 8. According to Figs. 5 and 6, the head 11 is secured to the central gear wheel 17 which engages the lateral gear wheels 18 revoluble upon the small shafts 33 and provided with the rods or projections 34 co-acting with one of the apertures 32 of the drums 7 for the purpose of actuating the same.

According to the arrangement shown in

Figs. 7 and 8, the head 11 is secured to the grooved pulley 19 which is provided with an elastic belt 22, stretched if desired by the stretching rollers 21, in order to effect the rotation of the second pulley 20 mounted on the shaft 35. The pulleys 19 and 20 are provided with the projections 34 co-acting with one of the apertures 32 of the drums 7. According to these two arrangements, when the head 11 rotates in one or the other direction, the film is actuated in one sense or the other.

The herein described apparatus may likewise be used for screen projection of the views of the film. For this purpose the apparatus may be secured (Fig. 4) in any suitable manner upon a stationary supporting member 13. Opposite the aperture 29 is disposed a source of light 14 constituted for instance by an electric lamp disposed within a casing 15 of any suitable shape. Opposite the lens 9, which now serves as a projection lens, a screen 16 is mounted at a suitable distance whereon is formed the image of the view bounded by the aperture 29. The film is actuated in either direction in order to successively effect the projection of all the views composing the film.

It is obvious that this invention is not limited to the arrangement hereinbefore described and represented, but that without departing from the principle thereof, it is susceptible of all modifications which may be judged necessary or advantageous from the requirements or the conditions of actual practice.

Having now described my invention, what I claim as new and desire to secure by Letters Patent is:

1. A toy apparatus for direct observation of the separate images of a picture film, comprising in combination; a casing and a removable cover for the same, an optical device in one side of the casing, the latter having an aperture in the opposite side, each view being observed through the said optical device in the direction of the aperture, two film carrying drums rotatably mounted in the casing, the width and depth of said casing being substantially equal to the width of the film and to the diameter of the drum carrying the wound film respectively, and means on the casing for rotating said drums from outside.

2. A toy apparatus for direct observation of the separate images of a picture film, comprising in combination; a casing, a removal cover for the same, an optical device in one side of the casing, the latter having an aperture in the opposite side, each view being observed through said optical device in the direction of the aperture, two film carrying drums rotatably mounted in the casing, the width and depth of said casing being substantially equal to the width of the film and to the diameter of the drum carrying the wound film respectively, each drum being provided at the periphery thereof with a slit and a longitudinal notch into which the corresponding tightly rolled end of the film may be inserted and means on the casing for rotating said drums from outside.

3. A toy apparatus for direct observation of the separate images of a picture film comprising in combination a casing, a removable cover for the same, an optical device in one side of the casing, the latter having an aperture in the opposite side, two film carrying drums, the width and the depth of the casing being substantially equal to the width of the film and to the diameter of the drum carrying the wound film, respectively and a set of apertures being formed in one side flange of each drum, hollow shafts secured to one side of the casing for rotatably supporting said drums and two driving shafts extending through the removable cover and within said hollow shaft, each driving shaft being provided with a bent pin adapted to enter any one of said apertures.

In testimony whereof, I have signed my name to this specification.

CHARLES LÉPINE.